Aug. 7, 1923.

M. RUHLAND

PHOTOGRAPHIC SCREEN

Original Filed March 22, 1913

1,464,139

INVENTOR
MAX RUHLAND
BY
ATTORNEY

Patented Aug. 7, 1923.

1,464,139

UNITED STATES PATENT OFFICE.

MAX RUHLAND, OF MUNICH, GERMANY, ASSIGNOR TO LUDWIG BÖHM, OF MUNICH, GERMANY.

PHOTOGRAPHIC SCREEN.

Application filed March 22, 1913, Serial No. 756,222. Renewed June 26, 1923.

(GRANTED UNDER THE PROVISIONS OF THE ACT OF MARCH 3, 1921, 41 STAT. L., 1313.)

*To all whom it may concern:*

Be it known that I, MAX RUHLAND, a subject of the German Emperor, residing at No. 18/1 Frundsbergstrasse, Munich, Germany, have invented certain new and useful Improvements in Photographic Screens (for which I have filed an application in Germany March 22, 1912, B 66812 VI/57d), of which the following is a specification.

This invention relates to screens for photographic reproducing purposes and particularly to screens used in the reproduction of colors, paper securities or wherever one or more screens are used and especially where two or more screens are used, as in the photolithographic reproduction of colors.

Heretofore screens of more or less regularity of pattern have been used for this purpose, requiring that the screens must be exactly placed relative to each other in order to avoid striped, spotted or patterned appearance in the finished picture. Various unsatisfactory methods have been devised to avoid this defect.

The principal object of the present invention is to provide a satisfactory screen in which exact relative placement of the screens is not required in order to avoid striped, spotted or patterned appearance in the finished picture, though the screen need not be limited to this particular use.

To this end I have provided a screen provided with irregular polygons of substantially the same superficial area but not having any exact regular arrangement relative to each other except that the boundaries between the polygons have the same width. Either the boundaries or the polygons may be light or dark.

The accompanying drawing shows two of many possible embodiments of the invention.

Figure 1:
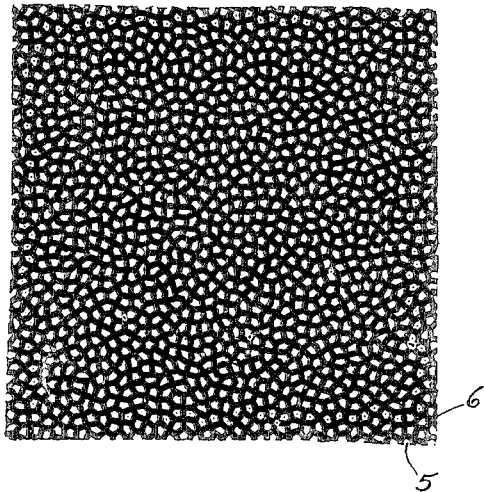
Fig. 1 is a face view of one form of the invention.
Figure 2:
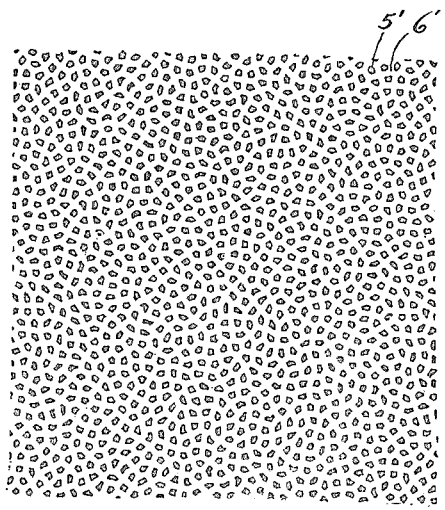
Fig. 2 is a face view of another form.

In one form the polygons 5 are lighter than the boundaries 6 and in the other the polygons 5' are heavier than the boundaries 6'.

The arrangement of the screens can be easily seen in the drawing. It will be noted that each polygon has a substantially different shape from all of the adjacent polygons, though the areas thereof are the same or approximately so. The boundaries have substantially the same width throughout, but that portion of the boundary between each adjacent pair either out of alinement with the adjacent portion of that boundary, or out of parallelism with the neighboring boundaries, practically always both.

This new screen is suitable for use in all reproducing processes in which a screen can be produced.

I claim as my invention:—

1. A halftone screen comprising a plurality of polygons, all irregular, and each having approximately the same superficial area, and all being irregularly placed on the surface of a plate in such a manner that the boundaries between the polygons have the same width.

2. A screen for photographic reproducing processes having screen apertures constituted by irregularly distributed irregular polygons of equal areas, and lines of equal width serving as boundaries or sides of said polygons.

3. A screen comprising a plurality of irregular polygons.

4. A screen comprising a plurality of irregular polygons having substantially the same area.

5. A photographic screen comprising a plurality of irregular polygons having straight edges and equal areas, each polygon having a shape different from the adjacent polygons, the boundaries between the polygons having equal width throughout.

6. A photographic screen comprising a plurality of irregular polygons having straight edges and equal areas, each polygon having a shape different from the adjacent polygons, the boundaries between the polygons having equal width throughout, the ratio of polygon to boundary being equal throughout all parts of the screen.

7. A photographic screen comprising a plurality of irregular polygons having straight edges and equal areas, each polygon having a shape different from the adjacent polygons, the boundaries between the polygons having equal width throughout, said boundaries extended across each other at approximately every conceivable angle.

8. A photographic screen comprising a plurality of irregular polygons of equal area, each having a different shape to any of the adjacent polygons.

9. A photographic screen comprising polygons having straight sides joining in angles, some of the angles being reflex, some obtuse, some right angles and some acute angles.

10. A photographic screen comprising polygons divided by boundary lines, each boundary line having a constant width and being out of parallelism with adjacent lines.

11. A photographic screen comprising polygons divided by boundary lines, each boundary line having a constant width and being out of parallelism with adjacent lines, different parts of each line being out of parallelism with each other.

12. A photographic screen provided with boundaries of constant width some part of every line being out of parallelism with some other part of itself and some part of every other line.

In testimony whereof I affix my signature in presence of two witnesses.

MAX RUHLAND.

Witnesses:
A. O. W. CONE,
JOHANNA STERN.